United States Patent [19]

Papuchon

[11] 4,198,116
[45] Apr. 15, 1980

[54] ELECTRO-OPTICAL SWITCH AND MODULATOR

[75] Inventor: Michel Papuchon, Paris, France

[73] Assignee: Thomson-CSF, Paris, France

[21] Appl. No.: 940,039

[22] Filed: Sep. 6, 1978

Related U.S. Application Data

[63] Continuation of Ser. No. 680,680, Apr. 27, 1976, abandoned.

[30] Foreign Application Priority Data

Apr. 30, 1975 [FR] France ........................ 75 13618

[51] Int. Cl.² .............................................. G02B 5/14
[52] U.S. Cl. .................................. 350/96.14; 350/355
[58] Field of Search ............... 350/96.11, 96.12, 96.13, 350/96.14, 355, 96.15

[56] References Cited

U.S. PATENT DOCUMENTS

| | | | |
|---|---|---|---|
| 3,850,503 | 11/1974 | Riseberg et al. | 350/96 WG |
| 3,883,220 | 5/1975 | Taylor | 350/96 WG |
| 3,909,108 | 9/1975 | Taylor | 350/96 WG |
| 3,964,819 | 6/1976 | Auracher | 350/96 WG |

FOREIGN PATENT DOCUMENTS

1301553 12/1972 United Kingdom ................ 350/96 C

OTHER PUBLICATIONS

Papuchon et al., "Electrically Switched Optical Directional Coupler: Cobra", *Appl. Phys. Ltrs.*, vol. 27, No. 5, Sep., 1975, pp. 289-291.

*Primary Examiner*—F. L. Evans
*Assistant Examiner*—John D. Lee
*Attorney, Agent, or Firm*—Cushman, Darby & Cushman

[57] ABSTRACT

An electrically controlled light switch, which can also be used as a light modulator in integrated optical circuits is disclosed. The coupling length of a directional coupler is modified by applying a voltage between two electrodes positioned upon two rectilinear parallel waveguides made of an electro-optical material and arranged on a common substrate, thus generating a field distribution crossing the two waveguides in opposite directions and resulting in opposite signed refractive index variations thereof.

10 Claims, 3 Drawing Figures

ELECTRO-OPTICAL SWITCH AND MODULATOR

This is a continuation, of application Ser. No. 680,680 filed Apr. 27, 1976, now abandoned.

FIELD OF THE INVENTION

This invention relates to an electro-optical switch and modulator, and more particularly to an electro-optical switch and modulator for integrated optical circuits.

BACKGROUND OF THE INVENTION

The name "integrated optical systems" has become generic to monolithic thin-film structures designed to process light signals and obtained by techniques of depositing, diffusion and etching, using masking operations and similar to those employed in the manufacture of integrated electronic circuits. It is possible in particular, using these techniques, to build linear structures characterized by a refractive index which is higher than that of the surrounding medium, and forming wave guides along which light propagates in accordance with a series of total reflections or progressive refractions.

In the prior art, it is known to combine two such waveguides by arranging them parallel to one another over part of their length in order to form directional couplers; through the medium of the evanescent wave phenomenon, the energy carried in the first waveguide is transferred progressively to the second waveguide and a maximum energy transfer is observed at the end of a certain length known as the coupling length, which depends upon the geometric and optical parameters of the structure and in particular upon the value of the refractive indices of the materials constituting the two waveguides, as well as that of the medium separating them; subsequently, the energy transfers progressively from the second waveguide to the first and so on. It is also known, by utilizing an electro-optical material, for one of the materials constituting the waveguide or the material which separates them, to vary the refractive index under the effect of an electric field, and thus by changing the coupling length, to electrically control the energy proportion transferred from one waveguide to the other; it is also possible, using this same principle, to form a light modulator by arranging parallel to the waveguide which carries the light-wave, a section of waveguide to which a greater or lesser proportion of said energy is transferred.

It has been recognized that the solution which requires the minimum control voltage for a given coupler, is that which utilizes two identical rectilinear waveguides, one of them being imparted a given variation in refractive index and the other a variation of the same amplitude but opposite sign.

To achieve this condition, it has been proposed to arrange parallel to the waveguides, in the coupling zone, three electrodes, one between the two waveguides and the two others at either side thereof; it is thus possible to subject the two waveguides of the coupler to electric fields of the same values but opposite directions. However, the need to reduce to some few wave lengths the interval between the waveguides and the coupling zone, imposes a very narrow width and consequently higher resistance, on the central electrode; since the spread capacitance of the system constituted by the three electrodes is not negligible, the long time constant of the circuit limits the latter to switching or modulating frequencies which are relatively low. Moreover, the presence of the central electrode, however narrow it may be, leads to an increase in the spacing between the waveguides and this, by reducing the coupling efficiency, increases the length of the coupler.

It has also been proposed, again in order to achieve opposite variations in refractive index in the two waveguides, that the earlier mentioned device with three electrodes should be used in order, at the time of manufacture of the coupler, to prepolarize in two directions, perpendicular to the wave guides, the material of which these later are made; with this objective in mind, the device as a whole is raised to a temperature in excess of the Curie point of the ferroelectric material constituting the waveguides; then, a voltage is applied between the central electrodes and the lateral electrodes while the assembly is slowly cooled. The central electrode is then discarded and the control voltage applied to the two sole remaining lateral electrodes, creates an electric field which, passing through the two waveguides in the same direction, is co-directional in one of them with the polarization vector and is oppositely directed thereto in the other; this field thus brings about oppositely directed variations in refractive index in the two waveguides of the coupler. However, as in the device described earlier, the temporary presence of a central electrode dictates a certain spacing between the two waveguides. Moreover, in order to manufacture this kind of coupler, it is necessary to carry out a high-temperature treatment on the overall integrated optical circuit, and this complicates the design and may not be compatible with the presence of other elements in the circuit.

SUMMARY OF THE INVENTION

It is therefore a primary object of the present invention to provide a novel electro-optical switch for integrated optical circuits.

It is another object of the invention to provide an electro-optical switch which can be controlled by low-power electrical signals, such as signals supplied by conventional integrated electronic circuits.

It is a further object of the invention to provide an electro-optical switch in which rapid switching can be achieved over a minimum length.

It is yet a further object of the invention to provide an electro-optical modulator utilizing an electro-optical switch as hereinabove.

These and other objects and advantages are accomplished in accordance with the invention by providing an electro-optical modulator controlled by a control voltage and which includes two parallel waveguides arranged on a same substrate and made of a same electro-optical material, and two parallel and coplanar control electrodes respectively covering said two waveguides over the whole of the coupling length; the control voltage being applied between said two electrodes and generating an electric field in the two waveguides and the substrate; said electric field passing through the two waveguides in substantially parallel but opposite directions, and thus giving rise to variations in refractive index which are of the same absolute value but opposite sign. The two waveguides may be arranged upon the surface of or inside the substrate.

BRIEF DESCRIPTION OF THE DRAWINGS

For a better understanding of the invention as well as other objects and further features thereof, reference is made to the following detailed disclosure of various preferred embodiments thereof taken in conjunction with the accompanying drawings wherein.

DESCRIPTION OF A FIRST EMBODIMENT

Figure 1:
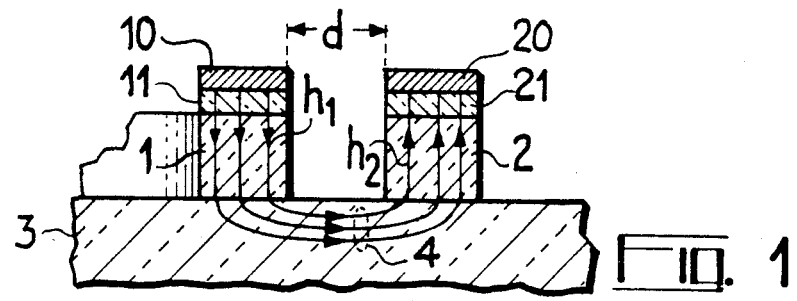
FIGS. 1 and 2 respectively illustrate a sectional view and a plan view of a first embodiment of the switch in accordance with the invention.
Figure 2:
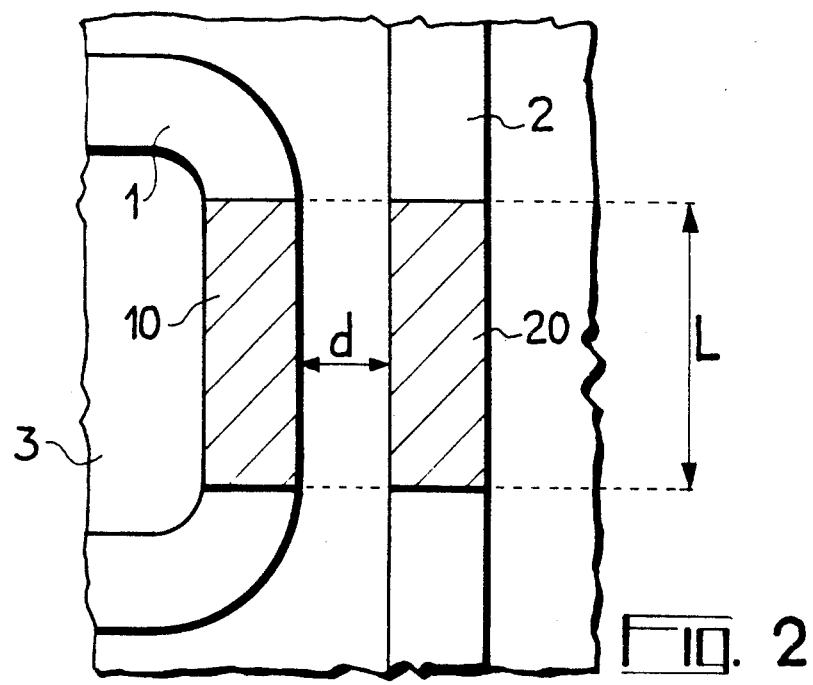

In FIGS. 1 and 2, which respectively illustrate a sectional view and a plan view of the switch in accordance with the invention, there can be seen two light waveguides 1 and 2 deposited upon the substrate 3. On those of their faces opposite to that in contact with the substrate, the two waveguides 1 and 2 each carry a metal electrode, 10 and 20 respectively, insulated from the waveguide by a transparent dielectric layer, respectively 11 and 21. These two waveguides will preferably have the same width and the same thickness and, as FIG. 2 shows, are mutually parallel over a rectilinear zone of length L which is a function of the so-called coupling length parameter which will be defined later; the distance between the parallel rectilinear parts, has a value d which should not exceed some few wave lengths (calculated in the medium separating the two waveguides, air in the case of the figure) of the light transmitted by the waveguides. The two waveguides are constituted by the same electro-optical material which, when subjected to an electric field, has a refractive index which varies as a function of the value of the applied field. The refractive index of this material is thus chosen so that even in the presence of the applied electric field, it remains higher than the refractive index of the material of which the substrate 3 is made.

When a voltage is applied between the electrodes 10 and 20, the potential distribution thus created gives rise to an electric field distribution of the kind shown by the reference 4 in FIG. 1 where the lines of force can be seen crossing the two waveguides and the substrate. This distribution is such that the electric fields $h_1$ and $h_2$ respectively crossing the waveguides 1 and 2, are substantially perpendicular to the plane of the substrate 3, equal in absolute value, and of opposite signs. Because of the electro-optical nature of the material of which the waveguides 1 and 2 are made, this distribution of the electric field lines in the waveguides, produces within the latter variations of refractive index which are substantially equal in absolute value but of opposite signs.

However, those skilled in the art will appreciate that when a wave is being transmitted through a waveguide, part of the energy propagates outside the waveguide in the surrounding medium, in the form of an evanescent wave; the amplitude of this wave decreases exponentially considered in the direction extending away from the walls of the waveguide. If a second waveguide is disposed parallel to the first, then through the agency of this evanescent wave it progressively picks up the energy transmitted in the first waveguide, this the faster the closer the two waveguides are together. At the end of a given distance known as the coupling length, this depending both on the geometric and the optical parameters of the two waveguides and the medium separating them (and in particular upon the refractive indices), a maximum of energy will have been transferred from the first waveguide to the second; beyond this coupling length, the reverse phenomenon takes place; the energy transfers progressively from the second waveguide to the first until the minimum value is reached in the second waveguide; any modification in the refractive index of one of the media, obviously acts in one way or another, on the coupling length.

In the device shown in FIGS. 1 and 2, the length L can be chosen equal to the coupling length in the absence of any applied electric field. Because of the perfect symmetry of the two waveguides in the coupling zone, the transfer of energy from the first waveguide to the second (or from the second to the first), is total. The application of a voltage between the electrodes 10 and 20 reduces the coupling length and part of the energy is retransferred from the second waveguide to the first (or from the first to the second). The overall result is then that as the voltage increases the energy transferred from the first waveguide to the second (or from the second to the first), as measured at the end of the coupling zone, diminishes until it reaches zero. The coupling between the two waveguides thus decreases from 100% to 0% as the applied voltage on the electrodes increases. The result would be the same if the length L had a value equal to an odd multiple of the coupling length at zero field.

It is also possible to give the length L a value equal to an even multiple of the coupling length at zero field. The coupling then increases from zero as the voltage applied between the electrodes increases from zero.

Thus, a device has been created which, under the control of an electrical signal, makes it possible to switch part or all of the energy carried by a waveguide to the other waveguide associated with it in the coupling zone.

It then goes without saying that if one of the waveguides is limited to a section having as its minimum length the length L of the coupling zone, the aforedescribed device makes it possible to 100% modulate the energy carried by the other waveguide.

DESCRIPTION OF A SECOND EMBODIMENT

Figure 3:
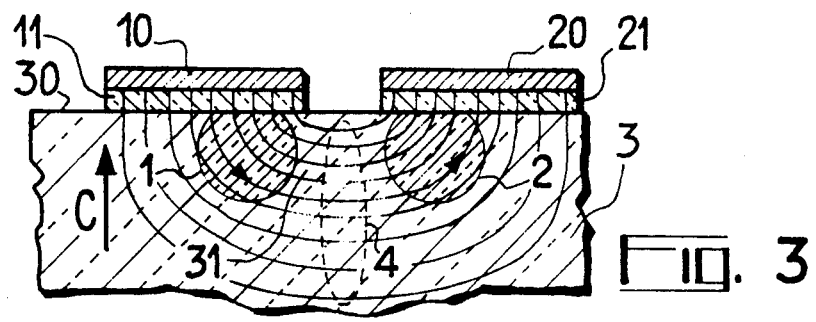
FIG. 3 illustrates a sectional view of a second embodiment of the switch in accordance with the invention.

FIG. 3 describes a second embodiment of the invention in which the waveguides are inserted into the substrate; the material through which coupling is effected, is then no longer air but that of which the substrate is made.

Considering the sectional view shown in FIG. 3, there can be seen the waveguides 1 and 2 which are disposed parallel to one another in the substrate 3 in such a fashion that one of their faces is flush with the surface of the substrate. Two metal electrodes 10 and 20, also mutually parallel, are arranged upon the waveguides at the surface of the substrate 3, through the medium of insulating layers 11 and 21.

To implant the waveguides 1 and 2 in the substrate 3, the following method can be adopted:

In order to manufacture the substrate 3, a monocrystalline wafer of lithium niobate (Li Nb O$_3$), this being a ferroelectric material having a rhombohedric crystalline structure, is used; the wafer is cut so that the axis of the rhombohedron constituting the crystalline lattice, is disposed parallel to the direction marked C in FIG. 3, that is to say perpendicularly to the surface 30 of the substrate. Then, at the surface 30 of the substrate 3 (using techniques of deposition, marking and etching of a thin titanium film), two thin titanium films are produced forming two bands with parallel edges, the path followed by which reproduces the path which the waveguides 1 and 2 are to conform to. The wafer is then heated in order to diffuse the titanium into the lithium niobate; the titanium, in the diffusion zone, partially substitutes the niobium in order to produce a mixed compound of the formula $Li\,Ti_x\,Nb_{1-x}O_3$, which is also ferroelectric in nature and rhombohedric in structure, and has a refractive index higher than that of the pure niobate; these diffused zones, having a higher refractive index than that of the substrate, constitute the waveguides 1 and 2. If the diffusion temperature is in excess of the Curie point of the material, then the ensuing cooling phase is utilized in order to subject the wafer to a uniform electric field in order to uniformly polarize the wafer and thus create a monodomain structure.

When a voltage is applied between the electrodes 10 and 20, a distribution in the electric field is produced, which corresponds to that indicated by the reference 4 in FIG. 3. The component of the field which is in the direction C perpendicular to the surface 30, has the same absolute value but is oppositely directed, in the two waveguides, bringing about variations in refractive index of the same absolute value but opposite sign. Nevertheless, the existence in a direction perpendicular to the direction C, of a non-zero field component, as well as the fact as the applied electric field also causes the value of the refractive index, in that part of the substrate 31 located between the two waveguides, to vary, produces a certain assymetry in the phenomenon; the coupling obtained varies in accordance with the polarity of the voltage applied between the electrodes 10 and 20. The polarity of the voltage furnishing the maximum coupling can be deduced from the crystallographic orientation of the material of which the substrate is made. If this orientation is not known, it is a very simple matter to determine the optimum polarity experimentally by measuring the light intensity transmitted by one of the waveguides for two polarities of opposite signs.

If the metal electrodes are deposited directly upon the surface of the waveguides, the existence of an evanescent wave propagating in the metal medium which is relatively absorbent, can give rise to energy losses in the coupler. To prevent this happening, it is possible, as FIGS. 1 and 3 show, to interpose a transparent dielectric layer 11 and 21 between the wave guides 1 and 2 and the electrodes 10 and 20, respectively. This insulating layer is made of a material having good transmissivity at the wave length of the light carried by the waveguide, and a refractive index less than that of the waveguide. Silica ($SiO_2$) constitutes an ideal material in the earlier described case in which the substrate is made of lithium niobate.

Still by way of non-limitative example, it is also possible in the embodiment described in FIG. 3, to utilize for the substrate, lithium tantalate ($LiTaO_3$) in which the niobium is partially substituted, again by a diffusion operation.

What I claim is:

1. An electro-optical switch for switching radiant energy between a first and a second optical circuit under the control of a voltage, comprising:
  a substrate;
  a first and a second waveguide positioned over a given length in close proximity to, but spaced from one another and respectively arranged in series in said first and second optical circuits; each said waveguide being made of an electro-optical material exhibiting a refractive index higher than that of the material of said substrate and being in lateral contact with said substrate along at least said given length;
  a first and a second electrode arranged over said substrate for respectively covering, along at most said given length, said first and said second waveguide; and said voltage being applied between said first and second electrodes.

2. A switch as claimed in claim 1, wherein said given length is equal to the coupling length at zero field multiplied by an integer at least equal to unity.

3. A switch as claimed in claim 1, wherein said first and second waveguides are rectilinear and have substantially the same size; said electro-optical material being substantially identical and having, in the absence of said voltage, substantially the same refractive index in both waveguides.

4. A switch as claimed in claim 1, wherein a transparent dielectric layer having a refractive index lower than that of said electro-optical material is arranged between respectively said first and second waveguides and said first and second electrodes.

5. A switch as claimed in claim 1, wherein said first and second waveguides are arranged upon the surface of said substrate and separated by air from each other.

6. A switch as claimed in claim 1, wherein said first and second waveguides are arranged inside said substrate.

7. A switch as claimed in claim 1, wherein said electro-optical materials and the material of said substrate are ferroelectric materials.

8. A switch as claimed in claim 7, wherein the material constituting said substrate being lithium tantalate, niobium is partially substituted for the tantalum in said lithium tantalate to form the material constituting said waveguides.

9. A switch as claimed in claim 7, wherein the material constituting said substrate being lithium niobate, titanium is partially substituted for the niobium in said lithium niobate to form the material constituting said waveguides.

10. An electro-optical modulator for modulating the radiant energy propagating in an optical circuit under the control of a voltage, comprising:
  a substrate;
  a first and a second waveguide positioned over a given length in close proximity to, but spaced from one another; and respectively arranged in series in said first and second optical circuits; each said waveguide being made of an electro-optical material exhibiting a refractive index higher than that of the material of said substrate and being in lateral contact with said substrate along at least said given length;
  a first and a second electrode arranged over said substrate for respectively covering, along at most said given length, said first and said second waveguide; and said voltage being applied between said first and second electrodes.

* * * * *